United States Patent Office 3,496,721
Patented Feb. 24, 1970

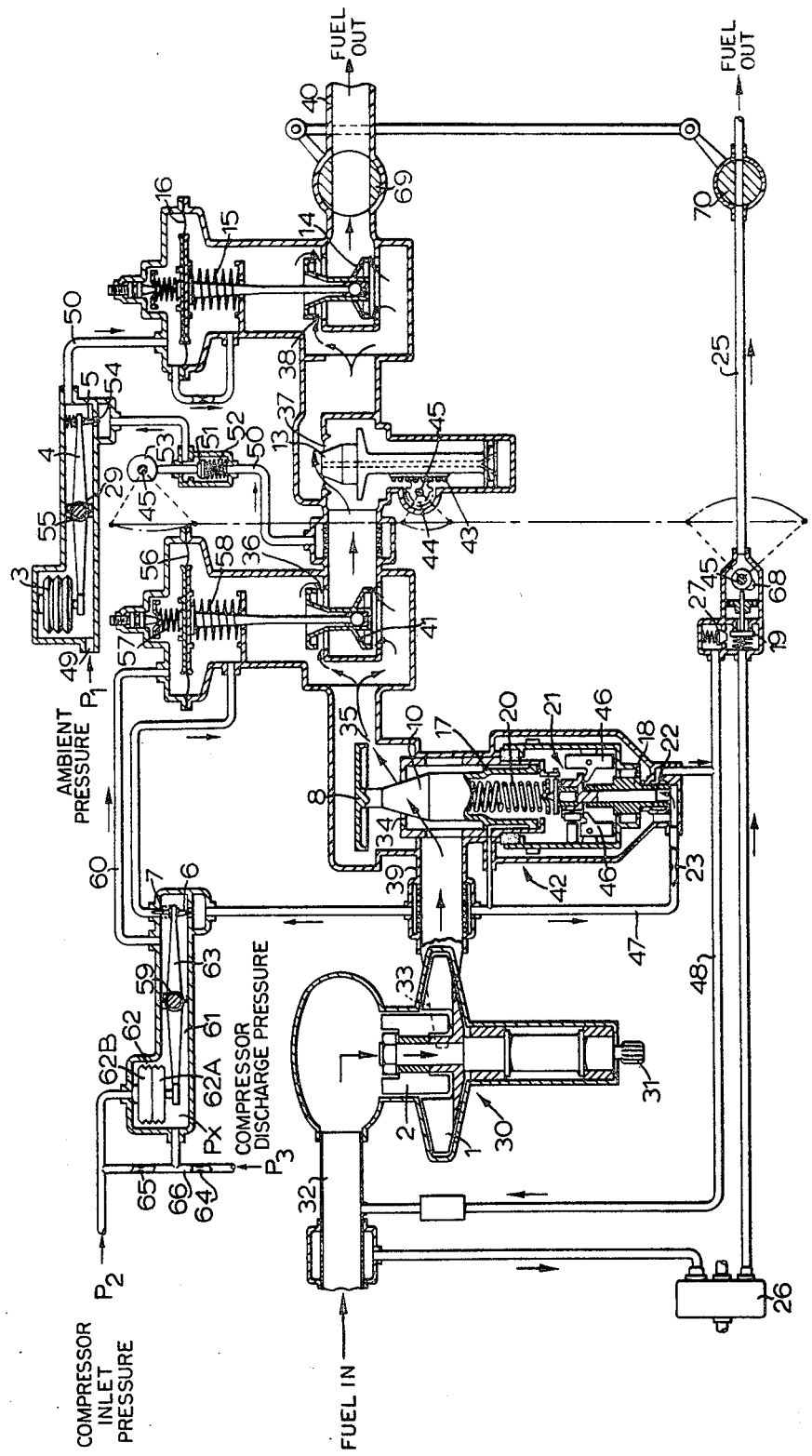

3,496,721
FUEL SUPPLY SYSTEMS FOR AIRCRAFT
Arthur Leslie Lloyd, Donald Craven, and David Marshall, Wolverhampton, England, assignors to H. M. Hobson Limited, London, England, a company of Great Britain
Filed Jan. 11, 1968, Ser. No. 697,196
Claims priority, application Great Britain, Feb. 21, 1967, 8,128/67
Int. Cl. F02c 9/04
U.S. Cl. 60—39.28       5 Claims

ABSTRACT OF THE DISCLOSURE

A fuel supply system for aircraft jet engines including individually controlled metering orifices which take command of the fuel flow over individual ranges of engine speed and devices for controlling the pressure drop across each metering orifice.

---

This invention provides a fuel supply system for an aircraft jet engine having a main burner, comprising a pump arranged to supply fuel to the main burner through three metering orifices in series, three individual control valves for controlling the effective areas of the metering orifices each of which takes command to control the fuel flow to the exclusion of the others over an individual range of engine speed, a governor operatively connected to two of the valves and arranged to operate one of them to control the fuel flow over a low range of engine speed and to operate the other valve to restrict the fuel flow when the engine speed attains a predetermined maximum value, a throttle lever for operating the third valve which acts as a throttle valve to control the fuel flow over an intermediate range of engine speed, a device for controlling the pressure drop across the two metering orifices controlled by the governor operated valves and a separate device for controlling the pressure drop across the metering orifice controlled by the throttle valve.

The metering valves collectively control the fuel flow to the engine by varying the restrictions they present to the flow. There are three modes of control: acceleration control, maximum speed control, and throttle control, provided respectively by individual control of the areas of the metering orifices by their respective valves. Preferably other restrictions are embodied in servo valves which control the pressure drops across the metering orifices. Each combination of metering orifice and associated pressure regulating valve will, in general, be demanding a different flow. However, the flow must be the same through all the valves and accordingly the metering orifice and pressure regulating valve demanding the smallest flow will be in control at any given time. The other pressure regulating valve, in demanding more flow, will be in its fully opened positions, this always occurring before the controlling pressure regulating valve has reached any limit in closing to reduce the flow.

At speeds up to ground idling speed, an acceleration control unit (A.C.U.) is in complete control, the throttle valve demanding a higher flow (that corresponding to ground idling speed).

Above ground idling speed but below the maximum speed of the engine under steady running conditions, the throttle valve is in complete control; the A.C.U. demanding a higher flow. The associated pressure regulating valve then controls the pressure drop across the throttle valve to a value which is a function of altitude and the engine thrust is then substantially proportional to the position of the pilot's throttle lever.

Under accelerating conditions the fuel demand of the throttle valve could be sufficient to cause the compressor of the engine to surge. This is prevented by the A.C.U., which takes control when the flow demand of the throttle valve becomes excessive.

The speed of the engine has to be limited to a fixed maximum value and this is done by the other control valve which overrides the other controls when the maximum speed is reached. In this condition the engine comes under closed loop speed control.

One embodiment of fuel supply system according to the invention is illustrated in the accompanying diagrammatic drawing.

A centrifugal pump 30 is driven by a splined extension 31 from the shaft (not shown) of the high speed compressor of the engine. To reduce the possibility of cavitation the fuel, which is fed through an inlet 32 to the centrifugal pump 30 from booster pumps (not shown), is passed through a screw type inducer 2 before it enters the main impeller 1 of the pump. Pressure recovery is effected through a tangential diffuser 33.

The fuel from the pump 30 passes through a pipe 39 to a pipe 40 leading to the main burner (not shown) through orifices 34, 35, 36, 37 and 38 controlled respectively by an A.C.U. valve 10, an override valve 8, a pressure regulating valve 41, a throttle valve 13 and a pressure regulating valve 14. The valves 10 and 8 are operated as later described by a governor 21 embodied in an acceleration control unit 42, the throttle valve 13 is operated by a rack 43 and a pinion 44 from a shaft 45 rotatable by the pilot's throttle lever (not shown). The pressure regulating valve 41 controls the pressure drop across the valves 10 and 8 and the pressure regulating valve 14 controls the pressure drop across the throttle valve 13.

The acceleration control unit (A.C.U.) 42 serves to prevent compressor surge and facilitates automatic starting. It is also required to limit the engine to a maximum rotational speed. The governor 21 is driven from the shaft of the high speed compressor through reduction spur gears, not shown.

As the governor 21 rotates, its flyweights 46 apply a force to a servo piston 17 through a spring 20 and also vary the axial position of a governor servo valve 18, which is spun with the governor to minimise inaccuracies due to friction and reduce the risk of failure due to sticking. Fuel at pump pressure passes from the upstream side of the A.C.U. 42 through a line 47, including a fuel potentiometer, constituted by the servo orifice 22 controlled by the valve 18 and a restrictor 23, to a line 48 leading to the suction side of the pump 30 so that the pressure drop across the piston 17 is controlled by the valve 18. The servo piston 17, and the A.C.U. metering valve 10 which is attached to it, are thus positioned as a function of engine speed.

Up to ground idling speed, the fuel flow is under control of the valve 10, but above that speed the fuel flow is under control of the throttle valve 13. The profile of the valve 13 is such as to give a linear increase in thrust above ground idling and a constant area below ground idling. The valve 13 also cuts off fuel flow completely when the throttle lever is moved to the shut off position.

Movement of the valve 8 is normally ineffective to restrict the fuel flow through the orifice 35. When however the engine speed rises to its maximum specified value, the valve 8 restricts the flow of fuel through the orifice 35. This overrides the other controls, allowing the governor 21 to bring the engine under closed loop control to prevent further increase in speed. If the engine speed then deviates from the chosen value for which the governor 21 is set, the governor will move the valve 8 to change the fuel flow to the engine to restore the engine speed to the chosen value.

The pressure regulating valve 14 controlling the pressure drop across the throttle valve 13 is operated by a diaphragm 16. The diaphragm 16 is subjected at its underside to the pressure of a spring 15 and at its upper side to the pressure of fuel in a line 50 by-passing the metering orifice 37. The line 50 contains a valve 51 which closes under the action of a spring 52 when the throttle valve 13 is closed but is opened by a cam 53 on the shaft 45 when the throttle valve 13 is opened. The diaphragm 16 thus compares the force arising from a proportion of the pressure drop across the metering orifice 37 with the load of the spring 15, moving the valve 14 so as to adjust said pressure drop to balance the forces of the diaphragm. The proportion of the pressure drop is a function of the opening of a needle valve 5 which controls the area of a restriction 54 in the line 50. The position of the needle valve 5 is determined by the expansion of an evacuated capsule 3 subject to ambient pressure $P_1$ through an inlet 49. A lever 4, pivoted at 55, is used to transmit the movement from the capsule 3 to the valve 5 through a seal 29 separating air from fuel. As altitude increases, the capsule 3 expands, so opening the needle valve 5 so that, for a given pressure drop across the metering orifice 37, the pressure drop across the diaphragm 16 is increased so causing the pressure regulating valve 14 to close, and the pressure drop across the metering orifice 37 to be reduced. It follows that for any given demand from the throttle valve 13, the fuel flow will reduce with increase in altitude.

The pressure regulating valve 41 which controls the pressure drop across the valves 10 and 8 is connected to a diaphragm 56 subjected at its underside to the pressure of a spring 58 and at its upper side to the pressure of fuel in a line 60 bypassing the valves 10 and 8 and to the pressure of a spring 57. The diaphragm 56 thus compares a proportion of the pressure drop across the valves 10 and 8 with the spring load constituted by the difference in pressures of the springs 58 and 57. This proportion is determined by two adjustable needle valves 6 and 7. These are positioned by a double capsule 62 in a chamber 61, the movement being transmitted from the capsule 62 to the valves 6, 7 by a lever 63 provided with a seal 59. The lower part 62A of the capsule 62 is evacuated and the upper part 62B contains air at compressor inlet pressure $P_2$. The air in the chamber 61 is at a pressure $P_x$ intermediate between compressor inlet pressure $P_2$ and compressor outlet pressure $P_3$, $P_x$ being taken from between two fixed orifices 64, 65 in a line 66 through which air is flowing from compressor outlet to compressor inlet. The resultant force on, and hence the movement of, the capsule 62 is thus proportional to $2P_x - P_2$. The profiles of the needles 6 and 7 is such as to provide a pressure drop across the A.C.U. metering valve 10 which is such a function of $2P_x - P_3$ that, when taken in conjunction with the area of the orifice 34 being increased linearly with speed, it gives a fuel flow at any engine condition which is less than the maximum permissible by a margin which is the same at all engine inlet temperatures and pressures.

As the same pressure drop is also applied across the governor valve 8, it serves to set a lower flow through the latter for a given opening when engine intake pressures are lower or temperatures higher. This serves to apply correction for the increased speed which would otherwise result in such conditions with the non-isochronous governor.

The primary burners (not shown) are supplied with fuel along a line 25 from a gear pump 26 which is driven through gears from the engine. The fuel passes through a valve 19 operated from the pilot's lever by means of a cam 68 on the shaft 45 so that the line 25 is closed off at shut-down and above ground idling. When the line is closed, a valve 27 passes fuel from the gear pump 26 to the inlet of the centrifugal pump 30.

Shut-off cocks 69, 70 are provided in the lines to the primary and main burners. These are mechanically linked together and to a lever in the cockpit which can be used in emergency for shutting down an individual engine.

The thrust of the engine is thus selectable by a single lever and is automatically kept within its safe operating limits at all times.

Despite the fact that the valves 41 and 14 are in series with the metering valves 10, 8 and 13 and are in part controlled by the pressure difference across said metering valves, valves 41 and 14 are herein termed pressure regulating valves for the following reason. The metering valves 10, 8 and 13 impose direct limitation on the flow of fuel to the engine, in accordance with their extent of opening, under the control of the governor and the pilot's throttle lever as already explained, each metering valve being in complete control over a particular range of engine speed, except during periods of acceleration when the valve 13 is in control, because the other metering valves and also the valves 41 and 14 permit a higher flow of fuel than the controlling metering valve. During periods of acceleration the valve 10 is able, as already explained, to take over control from the valve 13 if the throttle is opened so rapidly as to involve risk of compressor surge. The valves 41 and 14 serve to modify the fuel flow determined by the extent of opening of the metering valves 10, 8 and 13 in response respectively to changes in compression ratio across the compressor and to changes in altitude, the valve 41 effecting such modification by changing the pressure drop across the valves 10 and 8 and the valve 14 effecting such modification by changing the pressure drop across the valve 8. Under no circumstances do the valves 41 and 14 provide effective metering areas which impose a more severe restriction to fuel flow than the controlling metering valve. They only serve to modify the fuel flow provided by the effective metering area of whichever metering valve is in control by variation of the pressure drop across that metering valve.

What we claim as our invention and desire to secure by Letters Patent is:

1. A fuel supply system for an aircraft jet engine having a compressor and a main burner, comprising a pump arranged to supply fuel to the main burner through a fuel pipe containing three metering orifices in series, three individual metering valves for respectively controlling the effective areas of the metering orifices, each of said metering valves normally providing a smaller effective metering area at its metering orifice than the other metering valves over an individual range of engine speed and thereby taking command of the fuel flow to the exclusion of the other metering valves over said individual range of engine speed, a throttle lever connected to operate a first one of said metering valves to increase and decrease the flow of fuel to the engine over an intermediate range of engine speeds, a governor responsive to engine speed and operatively connected to the second and third of said metering valves, the governor operating the second metering valve to control the fuel flow over a low range of engine speeds below said intermediate range and also to restrict the fuel flow to prevent excessive acceleration of the engine when under control of the throttle lever in said intermediate speed range and the governor also operating the third metering valve, after the engine speed has attained a permitted maximum value, to control the flow of fuel through its metering orifice to prevent the engine speed from exceeding said maximum value, a device responsive to changes in compression ratio across the compressor for controlling the pressure drop across the metering orifices controlled by the second and third metering values and a separate device responsive to changes in altitude for controlling the pressure drop across the metering orifice controlled by the first metering valve.

2. A system as claimed in claim 1, in which the device controlling the pressure drop across the metering orifice controlled by the first metering valve comprises a valve in the fuel pipe in series with said metering valves and altitude-responsive means for adjusting said valve to provide a pressure drop across said metering orifice which decreases with increase in altitude.

3. A system as claimed in claim 2, in which said pressure drop controlling valve is controlled by a diaphragm subject at one side to a spring load and at the other to the fuel at a pressure which is a fraction of the pressure drop across the metering orifice controlled by the first metering valve and derived from a line by-passing said metering orifice and including a valve which moves, as altitude increases, to increase the fuel pressure applied to said other side of the diaphragm.

4. A system as claimed in claim 1, in which the device controlling the pressure drop across the metering orifices controlled by the second and third metering valves comprises a valve in the fuel pipe in series with said metering valves and a device responsive to variation in a pressure intermediate between compressor inlet and compressor outlet pressure for adjusting the setting of said valve.

5. A system as claimed in claim 4, in which said pressure drop controlling valve is controlled by a diaphragm subject to a pressure difference which is a fraction of the pressure drop across the metering orifices controlled by the second and third metering valves determined by $2P_x - P_2$, where $P_x$ is a pressure intermediate between compressor inlet pressure $P_2$ and compressor outlet pressure $P_3$.

References Cited

UNITED STATES PATENTS

| 2,644,513 | 7/1953 | Mock | 60—39.28 |
| 2,971,336 | 2/1961 | Mock | 60—39.28 |
| 3,105,354 | 10/1963 | McCombs | 60—39.28 |
| 3,220,184 | 11/1965 | Oprecht | 60—39.28 |
| 3,327,759 | 6/1967 | Lewis | 60—39.28 X |
| 3,449,909 | 6/1969 | Marshall et al. | 60—39.28 |

MARK M. NEWMAN, Primary Examiner